US008717755B2

(12) United States Patent
Haren (10) Patent No.: US 8,717,755 B2
(45) Date of Patent: May 6, 2014

(54) DOCKING DEVICE MOUNTING SYSTEMS AND METHODS (75) Inventor: Edgar Diego Haren, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 211 days.

(21) Appl. No.: 13/386,997

(22) PCT Filed: Sep. 29, 2009

(86) PCT No.: PCT/US2009/058794
§ 371 (c)(1),
(2), (4) Date: Jan. 25, 2012

(87) PCT Pub. No.: WO2011/040904
PCT Pub. Date: Apr. 7, 2011

(65) Prior Publication Data
US 2012/0120581 A1 May 17, 2012

(51) Int. Cl.
G06G 1/16 (2006.01)
G06F 1/16 (2006.01)
(52) U.S. Cl.
CPC .......... G06F 1/1607 (2013.01); G06F 1/1632 (2013.01)
USPC .................................................. 361/679.41
(58) Field of Classification Search
CPC ... G06F 1/1607; G06F 1/1632; G06F 1/1616; G06F 1/1656; G06F 1/1635; G06F 1/1626
USPC ...................................... 114/218; 361/679.41
See application file for complete search history.

(56) References Cited

U.S. PATENT DOCUMENTS

| 6,426,872 | B1 * | 7/2002 | Sutton et al. | 361/679.41 |
| 6,504,710 | B2 * | 1/2003 | Sutton et al. | 361/679.41 |
| 6,519,143 | B1 | 2/2003 | Goko | |
| 6,560,094 | B2 * | 5/2003 | Schmidt | 361/679.6 |
| 6,807,050 | B1 * | 10/2004 | Whitehorn et al. | 361/679.23 |
| 7,159,053 | B1 * | 1/2007 | Lakin | 710/62 |
| 7,200,702 | B2 * | 4/2007 | Keely et al. | 710/303 |
| 7,317,613 | B2 * | 1/2008 | Quijano et al. | 361/679.41 |
| 7,471,511 | B2 * | 12/2008 | Montag et al. | 361/679.41 |
| 7,477,510 | B2 * | 1/2009 | Liu | 361/679.08 |
| 7,502,226 | B2 * | 3/2009 | Searby et al. | 361/679.41 |

(Continued)

FOREIGN PATENT DOCUMENTS

JP 2007-293913 11/2007
JP 2008-176598 7/2008

OTHER PUBLICATIONS

International Searching Authority, International Search Report and Written Opinion, Appln.No. PCT/US2009/058794, date of mailing May 28, 2010, 12 p.

Primary Examiner — Lisa Lea Edmonds (57) ABSTRACT

A docking device mounting system (400) is provided. The system can include a display device (100) having a plurality of mounting features (110) disposed thereupon; a docking device (200) including a plurality of universal serial bus ("USB") interfaces (210, 220), at least one power interface (230), and at least one video interface (240); and at least one mounting member (300) having at least one mounting feature (320) and at least one extension member (330) disposed thereupon. Each of the at least one mounting member mounting features correspond to each of the plurality of display device mounting features and the at least one extension member permits detachable attachment of the docking device to the display device.

15 Claims, 6 Drawing Sheets

(56) References Cited

U.S. PATENT DOCUMENTS

| | | | |
|---|---|---|---|
| 7,589,959 B2 * | 9/2009 | Ikeda | 361/679.21 |
| 7,719,832 B2 * | 5/2010 | Kobara et al. | 361/679.58 |
| 7,848,090 B2 * | 12/2010 | Ikeda | 361/679.21 |
| 8,120,904 B2 * | 2/2012 | Morrison et al. | 361/679.58 |
| 8,411,426 B2 * | 4/2013 | Ikeda | 361/679.21 |
| 8,531,829 B2 * | 9/2013 | Oberpriller et al. | 361/679.41 |
| 2005/0270731 A1 * | 12/2005 | Yin | 361/681 |
| 2006/0008103 A1 * | 1/2006 | Takahashi et al. | 381/333 |
| 2007/0168593 A1 | 7/2007 | Montag et al. | |
| 2012/0300378 A1 * | 11/2012 | Tsai et al. | 361/679.3 |

\* cited by examiner

DOCKING DEVICE MOUNTING SYSTEMS AND METHODS

BACKGROUND OF THE INVENTION

Description of the Related Art

Docking devices are desktop appliances typically used to connect peripheral devices to portable electronic devices. In the most common example, a docking device can be connected to a laptop computer to enable the connection of input devices (e.g. keyboard and mouse) and output devices (e.g. monitor and printer) via a single connection rather than individually connecting each input and output device to the laptop. Due to the ever increasing number of peripheral devices, docking devices and the attendant peripheral cables often require significant desktop real estate.

SUMMARY OF THE INVENTION

A docking device mounting system is provided. The system can include a display device having a plurality of mounting features disposed thereupon; a docking device including a plurality of universal serial bus ("USB") interfaces, at least one power input, and at least one video output; and at least one mounting member having at least one mounting feature and at least one attachment feature disposed thereupon. Each of the at least one mounting member mounting features correspond to each of the plurality of display device mounting features and the at least one attachment feature permits the detachable attachment of the docking device to the display device.

A docking device mounting method is also provided. The method can include detachably attaching at least one mounting member having at least one mounting feature disposed thereupon to a display device having a plurality of mounting features disposed thereupon. Each of the one or more mounting member mounting features can correspond to each of the plurality of display device mounting features. Additionally, the one or more mounting members can accommodate the detachable attachment of a docking device. The method can also include detachably attaching a docking device comprising a plurality of universal serial bus ("USB") interfaces, at least one power input, and at least one video output, to the at least one mounting member.

Another docking device mounting system is also provided. The system can include a docking device having a plurality of universal serial bus ("USB") interfaces, at least one power input, and at least one video output. The system can further include a planar, rigid, mounting member having a plurality of mounting features disposed therein. The plurality of mounting features disposed upon the mounting member can include a plurality of apertures disposed in a pattern compliant with the Video Electronic Standards Association ("VESA") Mounting Interface Standard (VESA-MIS). A plurality of extension members adapted to accommodate the docking device can also be disposed about the mounting plate. The docking device can be detachably attached to the mounting member by engaging at least a portion of the extension members.

As used herein, the term "USB interface" or components described as "communicatively coupled via or using a USB interface" can include any USB 1.0 compliant, USB Version 2.0 compliant, or USB Version 3.0 compliant interface. Future USB compliant interface standards can also be considered within the scope of one or more embodiments herein described. The USB interface can be achieved using any current or future USB compliant connector, including, but not limited to, a USB-A compliant connector, a USB-B compliant connector, a mini USB-B compliant connector, a micro USB-A compliant connector, or a micro USB-B compliant connector.

As used herein, a "communicative connection", or a connection by which entities are "communicatively connected", is one in which signals, physical communications, and/or logical communications may be sent and/or received. Typically, a communicative connection includes a physical interface, an electrical interface, and/or a data interface, but it is to be noted that an communicative connection may include differing combinations of these or other types of connections sufficient to allow intermittent or continuous communication or control. For example, two entities can be communicatively connected by being able to communicate signals to each other directly or through one or more intermediate entities like a processor, operating system, a logic device, software, or other entity. Logical and/or physical communication channels can be used to create an operable connection.

As used herein, an "operable connection", or a connection by which entities are "operably connected", is one in which the entities are connected in a manner whereby the one entity is in some way connected to a second entity. An operable connection can be directly between the first and the second entities, for example through the use of threaded fasteners, nails, chemical adhesives, weldment, or the like. A direct connection between the first and the second entities can be non-detachable, for example through the use of chemical adhesives or weldment, or detachable, for example through the use of removable fasteners such as threaded fasteners or cam-lock connectors. An operable connection can be indirectly between the first and the second entities via one or more intermediate entities, for example a piston can be operatively connected to a crankshaft via a connecting rod, an intermediate entity.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
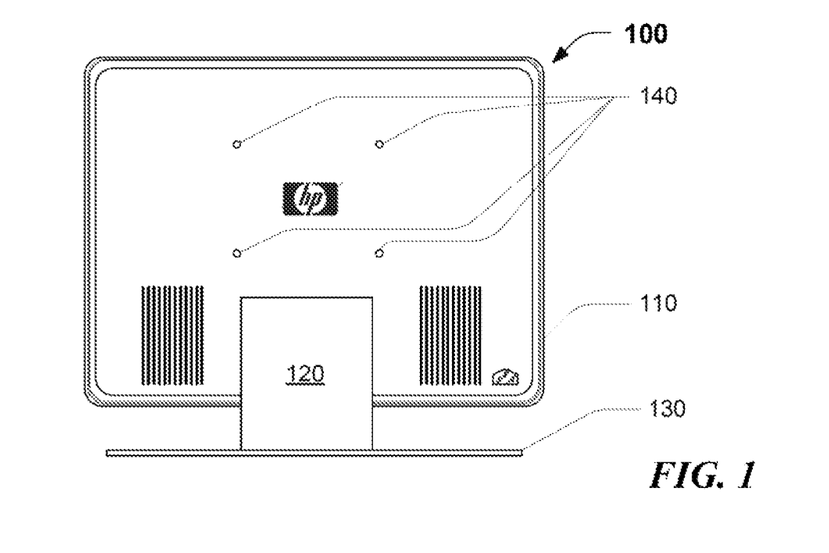
FIG. 1 depicts an elevation view of an exemplary display device, according to one or more embodiments described herein.

FIG. 1 depicts an elevation view of an exemplary display device 100, according to one or more embodiments. The display device 100 can be any device suitable for the output of data, for example a video display device suitable for the output of digital or analog video data. In one or more embodiments, the display device 100 can include, but is not limited to, a liquid crystal display ("LCD") device, a light emitting diode ("LED") device, an organic LED device, a cathode ray tube ("CRT") display device, or a gas plasma display device. The display device 100 can be partially or completely enclosed within a housing 110. The display device 100 can be operably connected to a stand 120 that, in turn, can be operably connected to a base 130 upon which the display device enclosure 110 can be supported. In one or more embodiments, the base 130 can be placed upon a surface such as a desk or equivalent work surface for use by one or more users.

One or more attachment or mounting features 140 can be disposed in, on, or about the enclosure 110. The one or more attachment features 140 can include any device, system or combination of systems and devices permitting the attachment of an accessory to the enclosure 110. The one or more attachment features can include, but are not limited to, one or more hooks, slots, voids, apertures, connectors, or fasteners disposed in any order, frequency, pattern, or arrangement. In one or more embodiments, all or a portion of the one or more attachment features 140 can include apertures having a female threaded connector disposed at least partially therein. In one or more specific embodiments, the one or more attachment features 140 can include one or more apertures having a female threaded connector approximately 10 mm in depth disposed at least partially therein, arranged in a physical configuration compliant with the Video Electronics Standards Association—Mounting Interface Standard ("VESA-MIS"), for example MIS-D 75 (75 mm×75 mm with an M4 female thread); MIS-D 100 (100 mm×100 mm with an M4 female thread); MIS-E (200 mm×200 mm); MIS-F (200 mm×200 mm; 400 mm×400 mm; 600 mm×200 mm; 600 mm ×400 mm; 800 mm×400mm; or 280 mm×150 mm with an M6 or M8 female thread).

Figure 2:
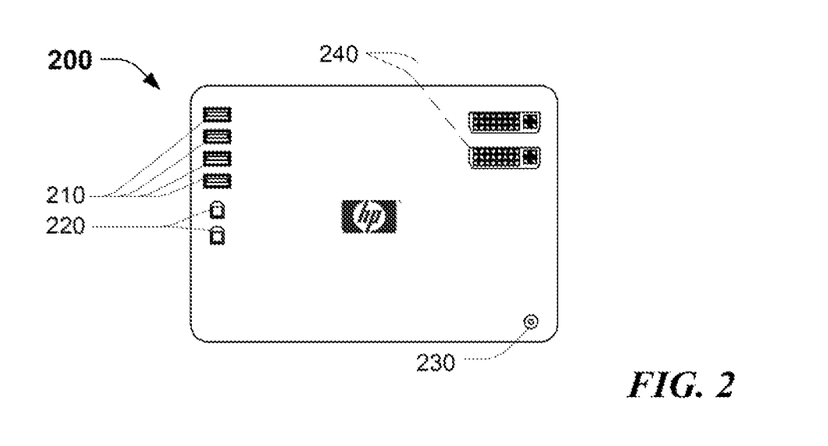
FIG. 2 depicts an elevation view of an exemplary docking device, according to one or more embodiments described herein.

FIG. 2 depicts an elevation view of an exemplary docking device 200, according to one or more embodiments. In one or more embodiments, the docking device 200 can include one or more of the following: USB interfaces 210, 220; power inputs 230; and video interfaces 240. The docking device 200 can further include the necessary controllers, busses, bridges, and processors (internal devices that are not visible in FIG. 2) to enable communication and control of the data flowing through the docking device 200.

The docking device 200 can permit the attachment of multiple peripheral devices to a computing device using a single connection to communicatively connect the computing device. For example, in one or more specific embodiments, a portable computing device can be communicatively connected to the docking device 200 via a USB interface 210, 220. One or more peripheral input devices, for example a keyboard, mouse, scanner, digitizer, or the like can similarly be communicatively connected to the docking device 200 via a USB interface 210, 220. In like manner, one or more peripheral output devices, for example a printer, display device 100, or the like can be communicatively connected to the docking device 200 via one or more USB interfaces 210, 220, and one or more video interfaces 240. In such a manner, a user can provide input to the computing device via peripheral keyboard and mouse, while generating output on the video display device 100. Many similar combinations are within the scope of those of ordinary skill in the art and should be considered within the scope of one or more embodiments contained or otherwise described herein.

As used herein, the term "computing device" can include, but is not limited to, laptop computers, netbook computers, ultraportable computers, personal digital assistants ("PDAs"), handheld computers, handheld gaming devices, and cellular communication devices.

As used herein, the term "video interface" or devices referred to as featuring one or more "video interfaces" can include, but are not limited to any digital or analog data interface. A video interface can provide unidirectional or bidirectional data transfer. Exemplary, non-limiting, video interface standards include: digital video interface ("DVI"); high-definition multimedia interface ("HDMI"); unified display interface ("UDI"); video graphics array ("VGA"); and video over USB.

The docking device 200 can have any size, shape, or configuration. The one or more USB interfaces 210, 220, power input 230, and the one or more video interfaces 240 can be disposed anywhere on an exterior surface of the docking device 200. The various interfaces are depicted on a single surface of the docking device 200 in FIG. 2 for clarity and ease of discussion, however any all of the various inputs and interfaces could be equally spread across one or more other external surfaces forming the docking device 200, for example, all or a portion of the interfaces can be disposed on one or more "edges" of the docking device 200.

In one or more embodiments, one or more USB interfaces 210, 220 can be disposed in any frequency, pattern, or arrangement, in, on, or about the docking device 200. In one or more embodiments, at least one of the one or more USB interfaces 210, 220 can provide bi-directional data communication when a computing device is communicatively coupled to the docking device 200.

The power interface 230 can include any interface suitable for supplying alternating current ("AC"), direct current ("DC"), or any combination thereof to the docking device 200. The power interface 230 can be a wired or wireless power connection. In one or more specific embodiments, the power interface 230 can be female type, prong interface, adapted to provide approximately 12VDC to the docking device 200 using an external AC-to-DC rectifying adapter.

Figure 3A:
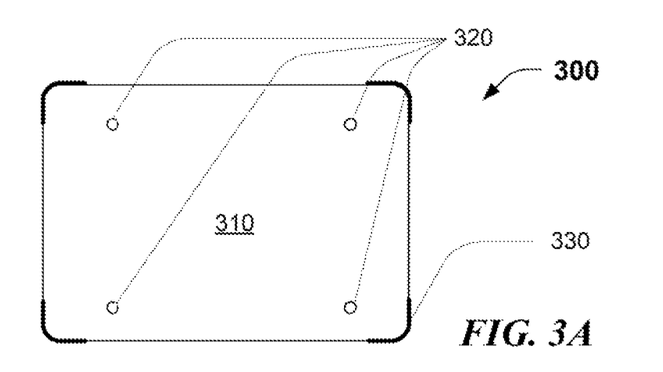
FIG. 3A depicts an elevation view of an exemplary mounting member, according to one or more embodiments described herein.

FIG. 3A depicts an elevation view of an exemplary mounting member 300, according to one or more embodiments. In one or more embodiments, the mounting member 300 can include a member 310 having a plurality of mounting features 320 disposed thereabout. The one or more mounting features 320 can be disposed in a regular or irregular pattern. In one or more specific embodiments, the one or more mounting features 320 can include a plurality of apertures arranged in a physical configuration compliant with the Video Electronics Standards Association—Mounting Interface Standard ("VESA-MIS"), for example MIS-D 75 (75 mm×75 mm); MIS-D 100 (100 mm×100 mm); MIS-E (200 mm×100 mm);

MIS-F (200 mm×200 mm; 400 mm×400 mm; 600 mm×200 mm; 600 mm×400 mm; 800 mm×400 mm; or 280 mm×150 mm).

One or more extension members 330 can be disposed symmetrically or asymmetrically about the mounting member 300. In one or more specific embodiments, the extension members 330 can be moulded in a resilient, flexible material with sufficient "give" that a user can insert the docking device 200 between two or more extension members 330. For example, the mounting member 300 can be a generally rectangular member 310 having extension members 330 disposed about all or a portion of each "corner" of the mounting member 300. Such an arrangement would permit the detachable operative connection of a docking member 200 between all or a portion of the four extension members 330 when a user applies pressure to the docking device, and would provide sufficient friction to prevent the detachment of the docking device 200 from the mounting member in the absence of a displacement force provided by the user.

Figure 3B:
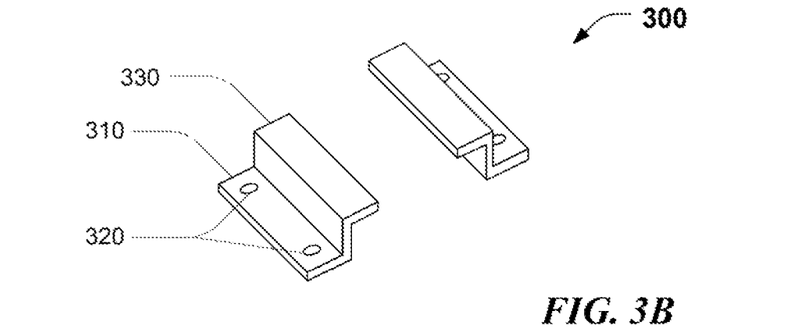
FIG. 3B depicts a perspective view of another exemplary mounting member, according to one or more embodiments described herein.

FIG. 3B depicts a perspective view of another exemplary mounting member 300, according to one or more embodiments. In one or more embodiments, the mounting member 300 can include a plurality of "Z"-shaped members as depicted in FIG. 3B. In one or more embodiments, each of the plurality of "Z"-shaped members can include a rigid, planar, member 310 adapted to detachably attach to the display device 100 via at least one mounting feature 320. In one or more specific embodiments, the one or more mounting features 320 can include a plurality of apertures arranged in a physical configuration compliant with the Video Electronics Standards Association—Mounting Interface Standard ("VESA-MIS"), for example MIS-D 75 (75 mm×75 mm); MIS-D 100 (100 mm×100 mm); MIS-E (200 mm×100 mm); MIS-F (200 mm×200 mm; 400 mm×400 mm; 600 mm×200 mm; 600 mm×400 mm; 800 mm×400 mm; or 280 mm×150 mm).

In one or more embodiments, the one or more extension members 330 can include, but are not limited to, an "L"-shaped extension as depicted in FIG. 3B. Such an arrangement would permit the detachable attachment of the docking member 200 to the display device 100 by detachably attaching the mounting features 320 on the mounting member 300 to the one or more mounting features 140 disposed on the display device 100. For example, the docking device 200 can be trapped between the mounting member 300 and the display device 100.

Figure 4:
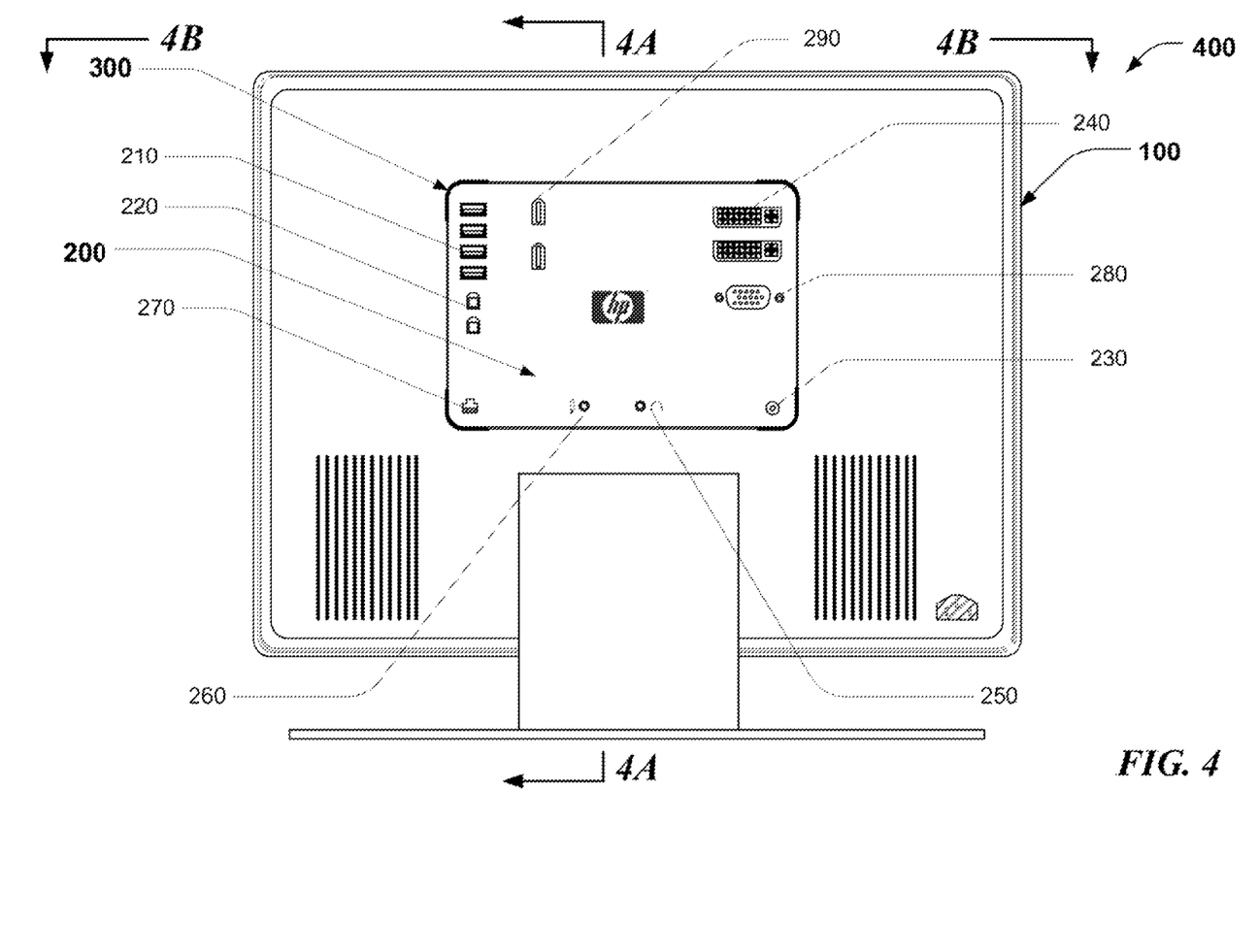
FIG. 4 depicts an exemplary docking station mounting system utilizing the exemplary display device of FIG. 1, the exemplary docking device of FIG. 2, and the exemplary mounting member of FIG. 3A, according to one or more embodiments described herein.
Figure 4A:
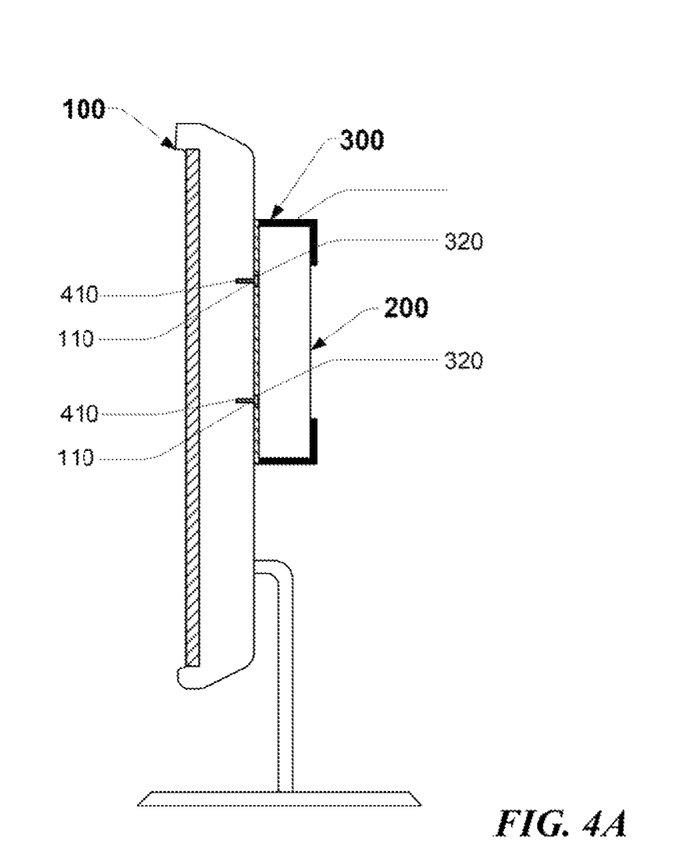
FIG. 4A depicts a partial sectional view of the exemplary docking station mounting system depicted in FIG. 4, taken along line 4A-4A, according to one or more embodiments described herein.
Figure 4B:
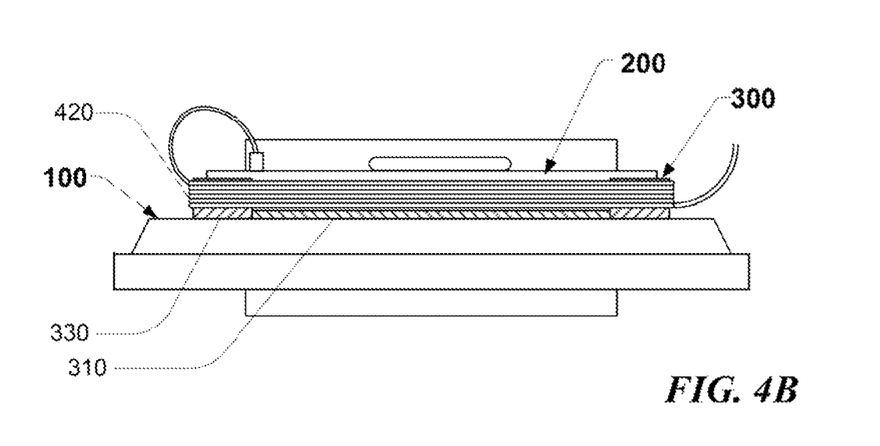
FIG. 4B depicts a plan view of the exemplary docking station mounting system depicted in FIG. 4, taken along line 4B-4B, according to one or more embodiments described herein.

FIG. 4 depicts an exemplary docking station mounting system 400 utilizing the exemplary display device 100 of FIG. 1, the exemplary docking device 200 of FIG. 2, and the exemplary mounting member 300 of FIG. 3A, according to one or more embodiments. FIG. 4A depicts a partial sectional view of the exemplary docking station mounting system 400 depicted in FIG. 4, taken along line 4A-4A, according to one or more embodiments. FIG. 4B depicts a plan view of the exemplary docking station mounting system 400 depicted in FIG. 4, taken along line 4B-4B, according to one or more embodiments. FIGS. 4, 4A, and 4B depict an illustrative embodiment depicting the mounting member 300 detachably attached to the display device 100 via the one or more display member mounting features 140 and the one or more mounting member mounting features 320.

In one or more specific embodiments, as depicted in FIG. 4A, the display device 100 mounting features 140 can include a plurality of female threaded apertures disposed in a VESA-MIS compliant pattern. Similarly, the mounting member 300 mounting features 320 can include a plurality of apertures disposed in a VESA-MIS compliant pattern on the member 310. In this embodiment, the detachable attachment of the mounting member 300 to the display device 100 can be accomplished using a plurality of threaded fasteners 410 passed through the mounting member 300 mounting features 320 and threaded into the display device 100 mounting features 140.

The extension members 330 can include a plurality of flexible extension members disposed at all or a portion of the corners of the member 310. The docking device 200 can be detachably attached to the extension members 330 by frictionally engaging all or a portion of the flexible extension members 330 with the docking device 200.

In one or more embodiments, as depicted in FIG. 4B, all or a portion of the extension members 330 can be adapted to accommodate the storage of one or more cords or cables 420. For example, in one or more embodiments, excess cords or cables can be wound around the perimeter of the mounting member 300 using the one or more extension members 330 for support. In one or more embodiments, one or more features can be disposed or otherwise incorporated into the extension members 330 to facilitate the installation and storage of excess cables or cords about the exterior perimeter of the mounting member.

In one or more embodiments, additional interfaces can be disposed in, on, or about the docking device 200. For example, one or more audio output interfaces 250 can be disposed in, on, or about the docking device. The one or more audio output interfaces 250 can include any wired or wireless connection suitable for transmitting an analog or digital audio signal to one or more external devices. For example, in one or more specific embodiments, the audio output interface can include a 3.5 mm headphone jack connection.

In a like manner, one or more audio input interfaces 260 can be disposed in, on, or about the docking device 200. The one or more audio input interfaces 260 can include any wired or wireless connection suitable for receiving an analog or digital audio signal from one or more external devices. For example, in one or more specific embodiments, the audio input interface can include a 3.5 mm microphone jack connection.

In one or more embodiments, one or more analog or digital video interfaces 280, including one or more legacy video interfaces, can b~disposed in, on, or about the docking device 200. The one or more analog or digital audio interfaces 280 can include any wired or wireless connection suitable for the transmission or receipt of one or more video signals. In one or more embodiments, as depicted in FIG. 4, the analog or digital video interface 450 can include a Video Graphics Array ("VGA") interface, for example a DE15F VGA Port.

In one or more embodiments, one or more analog or digital input/output interfaces 290 can be disposed in, on, or about the docking device 200. The one or more analog or digital input/output interfaces 290 can include any wired or wireless connection suitable for the transmission of analog or digital data. Exemplary analog or digital input/output interfaces 290 can include, but are not limited to, one or more Institute of Electrical and Electronics Engineers (IEEE) 1394 compliant interfaces; one or more serial communications ports, one or more parallel communications ports or any combination thereof.

In one or more embodiments, one or more communications interfaces 270 can be disposed in, on, or about the docking device 200. The one or more communications interfaces 270 can include any wired or wireless connection suitable for the transmission of analog or digital data. Exemplary analog or digital communications interfaces 270 can include, but are not limited to, one or more wired Ethernet interfaces (e.g., 8P8C/RJ45); one or more Bluetooth® wireless interfaces;

one or more IEEE 802.11 compliant wireless interfaces; or one or more cellular wireless interfaces (e.g., Code Division Multiple Access "CDMA," 3rd generation wireless ("3G"), 4th generation wireless ("4G"), Enhanced Data rates for GSM Evolution ("EDGE"), and the like.

Figure 5:
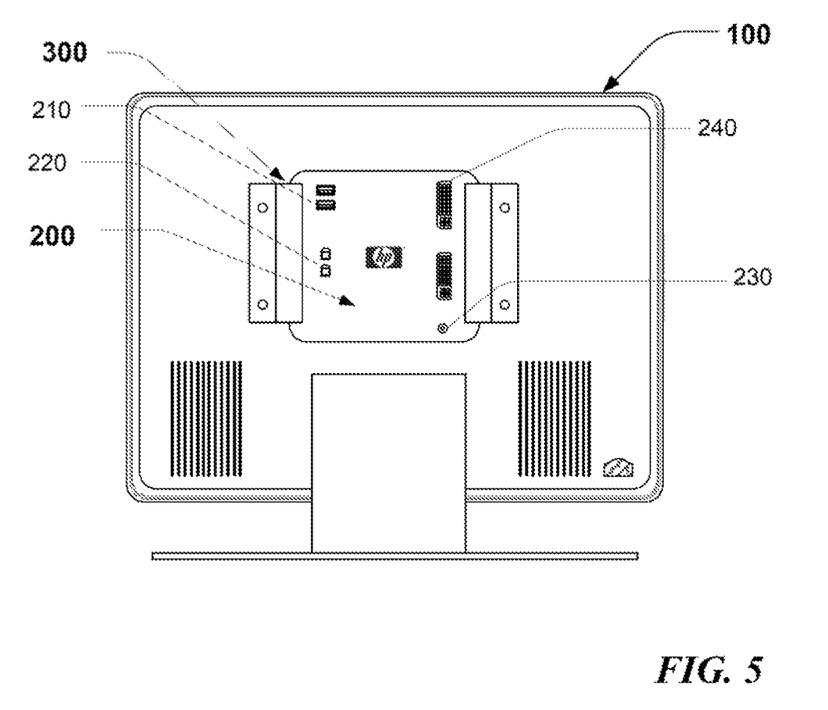
FIG. 5 depicts another exemplary docking station mounting system utilizing the exemplary display device of FIG. 1, the exemplary docking device of FIG. 2, and the exemplary mounting member of FIG. 3B, according to one or more embodiments described herein.

FIG. 5 depicts another exemplary docking station mounting system 500 utilizing the exemplary display device 100 of FIG. 1, the exemplary docking device 200 of FIG. 2, and the exemplary mounting member 300 of FIG. 3B, according to one or more embodiments. In one or more specific embodiments, the display device 100 mounting features 140 can include a plurality of female threaded apertures disposed in a VESA-MIS compliant pattern. Similarly, the mounting member 300 mounting features 320 can include a plurality of apertures disposed in a VESA-MIS compliant pattern on each of the plurality of "Z"-shaped members 310. In this embodiment, the detachable attachment of the mounting member 300 to the display device 100 can be accomplished using a plurality of threaded fasteners 410 passed through the mounting member 300 mounting features 320 and threaded into the display device 100 mounting features 140. The docking device can be detachably attached to the display device 100, trapped between the plurality of "Z"-shaped mounting members 300 and the display device 100.

Figure 6:
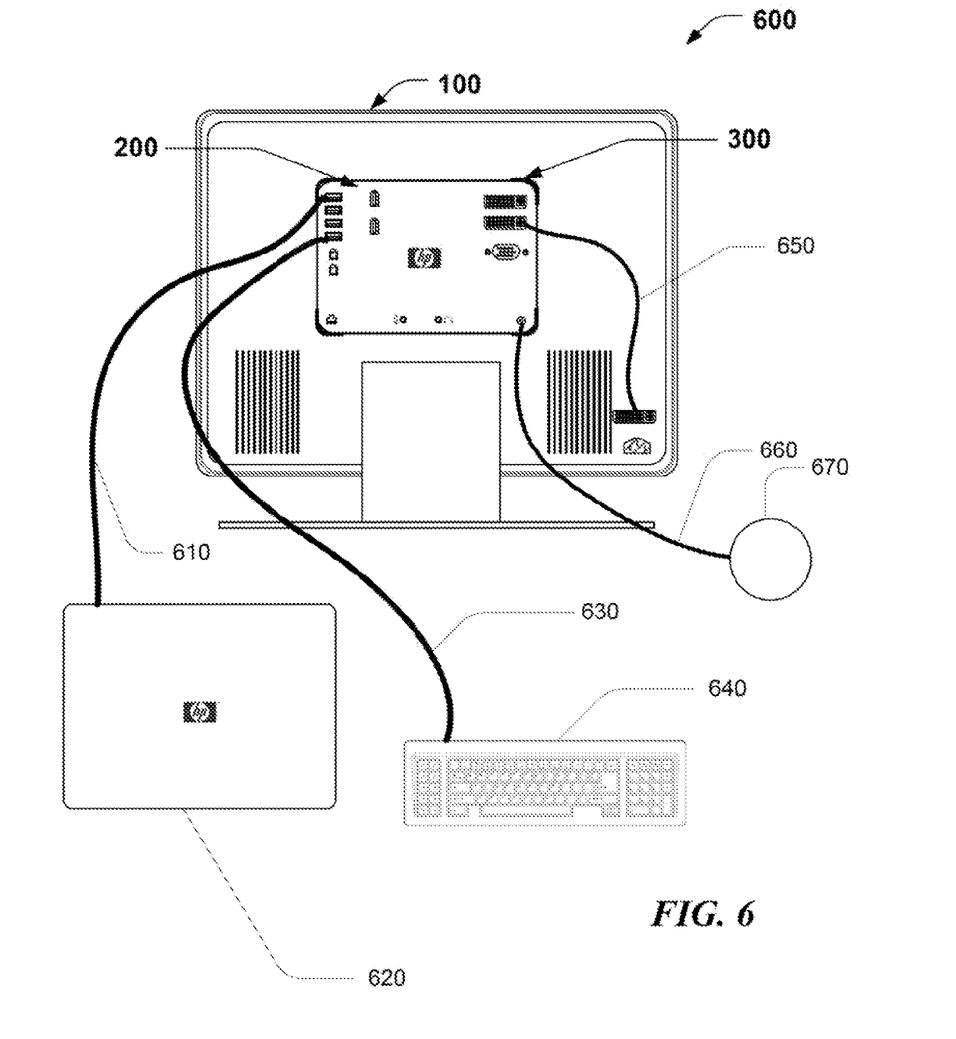
FIG. 6 depicts exemplary peripheral devices communicatively connected to the exemplary docking station mounting system depicted in FIG. 4, according to one or more embodiments described herein.

FIG. 6 depicts exemplary peripheral devices communicatively connected to the exemplary docking station mounting system 400 depicted in FIG. 4, according to one or more embodiments. In one or more embodiments, the system can include a docking device 200, communicatively coupled to a computing device 620, an input device 640, the display device 100 can be communicatively, and a power supply 670. The system 600 can provide various input and output functionality to the computing device 620. For example, the computing device 620 can be a laptop computer having a small screen and reduced size keyboard typically found on such devices. Communicatively coupling the computing device 620 to the docking device 200 can permit the use of enhanced input and output devices, such as a larger monitor and full size keyboard, thereby extending both the functionality and the usefulness of the laptop computer.

The computing device 620 can be any portable, handheld, electronic device, including, but not limited to, a laptop computer, a netbook computer, an ultraportable computer, a cellular communication device, a personal digital assistant ("PDA"), or a handheld gaming system. The computing device 620 can include one or more interfaces to enable communicative coupling of the device with other electronic devices. In one or more embodiments, the computing device 620 can include a USB interface, an IEEE 1394 interface, or any combination thereof. The computing device 620 can be communicatively coupled 610 to the docking device 200 via one or more wireless or wired interfaces, for example a USB interface 210, 220.

The input device 640 can be any device suitable for providing an input signal to the computing device 620. Typical input devices 640 can include, but are not limited to, keyboards, pointing devices such as a mouse or trackball, numeric keypad, scanner, barcode reader, or the like. The input device 640 can transmit data to and receive data from the computing device using one or more wired or wireless interfaces, for example a USB interface, an IEEE 1394 interface, a serial interface, a parallel interface, or the like. The input device 640 can be communicatively coupled 610 to the docking device 200 via one or more wireless or wired interfaces, for example a USB interface 210, 220.

The display device 100 can be communicatively connected to the decking device 200 via one or more wired or wireless interfaces. In one or more embodiments, the display device 100 can be communicatively connected to the computing device 620 using one or more DVI interfaces 240.

The power source 670 can include any devices, systems, or combination of systems and devices suitable for converting or otherwise providing power to the docking device 200. In one or more embodiments, the power source can include one or more power transformers, inverters, conditioners, or any combination or frequency thereof. For example, the power source 670 can include one or more power transformers and one or more power inverters to convert 110V Alternating Current to 12V Direct Current. The power source 670 can be wired or wirelessly communicatively coupled 660 to the docking station 200.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A docking device mounting system, comprising:
    a display device having a plurality of attachment features disposed thereupon;
    a docking device comprising a plurality of universal serial bus ("USB") interfaces, at least one power interface, and at least one video interface; and
    at least one mounting member having at least one mounting feature and a plurality of flexible extension members disposed about the periphery the of the mounting member;
    wherein each of the at least one mounting member mounting features correspond to each of the plurality of display device attachment features; and
    wherein the plurality of flexible extension members are adapted to frictionally grip the docking device to permit the detachable attachment of the docking device to the mounting member.

2. The system of claim 1, wherein the docking device further comprises:
    an audio output;
    an audio input; and
    a communications interface.

3. The system of claim 1, wherein the plurality of attachment features disposed upon the display device comprise female threaded apertures.

4. The system of claim 1, wherein the at least one mounting member comprises a rigid, planar member adapted to detachably attach to the display device via the at least one mounting feature.

5. The system of claim 1, wherein the at least one mounting member comprises a plurality of "Z" shaped members; wherein each of the "Z" shaped members comprise a rigid, planar, member adapted to detachably attach to the display device via the at least mounting feature; and
   wherein each of the plurality of flexible extension members comprises an "L" shaped extension adapted to detachably attach to the docking device.

6. The system of claim 4, wherein at least a portion of the plurality of flexible extension members are adapted to accommodate at least one cable routed about the perimeter of the mounting member.

7. The system of claim 2, wherein the communications interface is selected from the group of communications ports consisting of: an Ethernet compliant wired connection; an IEEE 802.11 compliant wireless local area network ("WLAN") connection; and a Bluetooth® wireless local area network.

8. A docking device mounting method, comprising:
   detachably attaching at least one mounting member having at least one mounting feature disposed thereupon to a display device having a plurality of attachment features disposed thereupon;
   wherein each of the one or more mounting member mounting features correspond to each of the plurality of display device attachment features;
   wherein the docking device comprises a plurality of universal serial bus ("USB") interfaces, at least one power input, and at least one video output; and
   detachably attaching the docking device to the at least one mounting member by frictional gripping the docking device with a plurality of flexible extension members that are disposed about the periphery of the mounting member.

9. The method of claim 8, further comprising:
   communicatively coupling a computing device to at least one docking device USB interface;
   communicatively coupling an input device to at least one docking device USB interface;
   communicatively coupling at least one docking device video output to the display device; and
   coupling a power supply to the docking device power input.

10. The method of claim 9, wherein the computing device is selected from the group of computing devices consisting of: a laptop computer, a netbook computer, an ultraportable computer, a cellular communication device, a personal digital assistant ("PDA"), and a handheld gaming system.

11. The method of claim 8,
   wherein the plurality of attachment features disposed upon the display device comprise female threaded apertures; and
   wherein the detachable attachment of the mounting member to the display device is accomplished using a plurality of threaded fasteners.

12. The method of claim 8, wherein each of the plurality of flexible extension members is adapted to detachably attach to the docking device.

13. The method of claim 8, wherein the mounting member comprises at least one "Z" shaped member; wherein each of the at least one "Z" shaped members comprise a planar, rigid, plate adapted to detachably attach to the display device via at least one mounting feature;
   wherein each of the plurality of flexible extension members comprises an "L" shaped extension adapted to detachably attach to the docking device; and
   wherein detachably at attaching the docking device comprises at least one of the "L" shaped extensions.

14. A docking device mounting system, comprising:
   a docking device comprising a plurality of universal serial bus ("USB") interfaces, at least one power interface, and at least one video interface; and
   a mounting member comprising a planar, rigid, plate having a plurality of mounting features disposed therein;
   wherein the plurality of mounting features disposed upon the mounting member comprise a plurality of apertures;
   wherein a plurality of extension members are adapted to accommodate the docking device are disposed about the periphery of the mounting plate; and
   wherein the docking device is detachably attached to the mounting member by engaging at least a portion of the plurality of extension members such that friction between the portion of the plurality of flexible extension members and the docking device prevents detachment of the docking device from the mounting member.

15. The system of claim 14, further comprising:
   a display device comprising a flat panel display surrounded at least partially by a rigid enclosure;
   wherein a plurality of female threaded apertures are disposed about an exterior surface of the rigid enclosure; and
   wherein the mounting member is detachably attached by the passage of a male threaded fastener through at least a portion of the mounting member apertures into the female threaded display device apertures.

* * * * *

UNITED STATES PATENT AND TRADEMARK OFFICE
CERTIFICATE OF CORRECTION

PATENT NO.         : 8,717,755 B2
APPLICATION NO.    : 13/386997
DATED              : May 6, 2014
INVENTOR(S)        : Edgar Diego Haren Page 1 of 1

It is certified that error appears in the above-identified patent and that said Letters Patent is hereby corrected as shown below:

In the Claims:

In column 8, line 47, in Claim 1, before "of" delete "the".

In column 9, line 5, in Claim 5, after "least" insert -- one --.

In column 9, line 31, in Claim 8, delete "frictional" insert -- frictionally --, therefor.

In column 10, line 19, in Claim 13, before "attaching" delete "at".

In column 10, line 20, in Claim 13, before "at" insert -- engaging --.

Signed and Sealed this
Fifth Day of August, 2014

Michelle K. Lee
*Deputy Director of the United States Patent and Trademark Office*